Patented June 10, 1930

1,762,270

UNITED STATES PATENT OFFICE

ERWIN HOFFA AND HANS HEYNA, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

2-SUBSTITUTED-1-METHYL-PHENYL-3-MERCAPTANS

No Drawing. Application filed November 24, 1928, Serial No. 321,757, and in Germany October 23, 1926.

Our present invention relates to the compounds of the general formula:

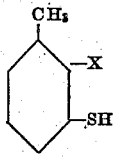

wherein X stands for the CN- or COOH-group. These compounds are obtainable by diazotizing a 1-methyl-3-aminobenzen compound, which is substituted in the 2-position by a CN- or COOH-group and transforming the diazo group according to the so called xanthogenate process into the SH-group.

The compound of the following formula:

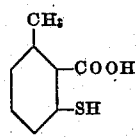

may also be obtained by starting from 2-methyl-6-chloro-1-benzoic acid and exchanging the halogen for the SH-group analogous to the process of German patent specification No. 189,200.

The new compounds are valuable starting materials for the preparation of indigoïd dyestuffs, containing following grouping:

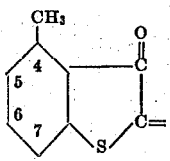

wherein the 5-, 6- and 7-positions are occupied by hydrogen.

The following examples serve to illustrate our invention but they are not intended to limit it thereto, the parts being by weight:

1. 132 parts of 1-amino-2-cyano-3-methylbenzene, melting at 128° C., are stirred together with 30 parts of hydrochloric acid of 22° Bé. and 30 parts of water and there are then added at 0° C.–5° C. 20 parts of a sodium nitrite solution of 40% strength. The diazo solution is run at 70° C.–80° C. into a solution of 20 parts of potassium xanthogenate, 30 parts of sodium carbonate and 100 parts of water. The mixture is cooled to 0° C., filtered and the mass remaining on the filter is heated to boiling with a mixture of 50 parts of alcohol, 25 parts of caustic soda solution of 40° Bé. and 50 parts of water for 2 hours. The alcohol is distilled off; the residue is diluted with water and acidified with hydrochloric acid. The 3-mercapto-2-cyano-1-methylbenzene precipitates and crystallizes from petroleum ether in the form of colorless needles, melting at 88° C. By treating the thiophenol with an oxidizing agent, it is easily transformed into the corresponding disulfide, melting at 189° C.

2. 151 parts of 1-amino 3-methylbenzene-2 carboxylic acid, melting at 125° C., are stirred together with 200 parts of water and 30 parts of hydrochloric acid of 22° Bé. and there are then added at 0° C.–5° C. 18 parts of a sodium nitrite solution of 40% strength. The clear diazo solution is run, while well stirring at 0° C.–5° C., into a solution of 20 parts of potassium xanthogenate, 50 parts of sodium carbonate and 200 of water. 45 parts of caustic soda solution of 40° Bé. are then added. The mixture is then heated at 80° C–100° C. for 1 hour, is stirred at this temperature for 2 hours, filtered and acidified. The 3-methyl-1-thiophenol-2-carboxylic acid precipitates. By treating it with an oxidizing agent, it may easily be transformed into the corresponding disulfide, which crystallizes from glacial acetic acid in the form of colorless needles, melting at 172° C.–174° C.

This application is to be regarded as a continuation-in-part of our application Ser. No. 226,039, filed on Oct. 13, 1927.

We claim:

1. As new products, the compounds of the general formula:

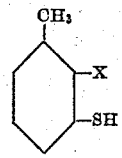

wherein X stands for the CN- or COOH-group, being crystalline bodies and capable of being converted in the presence of an alkali by means of mono-chloroacetic acid into compounds of the general formula:

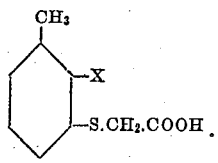

wherein X stands for the CN- or COOH- group.

2. As a new product, the 3-mercapto-2-cyano-1-methylbenzene of the formula:

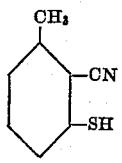

being a colorless body of the melting point 88° C., which, by oxidation, is converted into the corresponding disulfide, melting at 189° C., and by the action of chloroacetic acid in the presence of an alkali forms the 2-cyano-1-methylbenzol-3-thioglycolic acid of the formula:

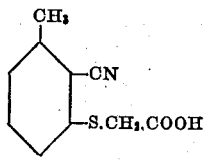

In testimony whereof, we affix our signatures.

ERWIN HOFFA.
HANS HEYNA.